United States Patent Office 2,975,834
Patented Mar. 21, 1961

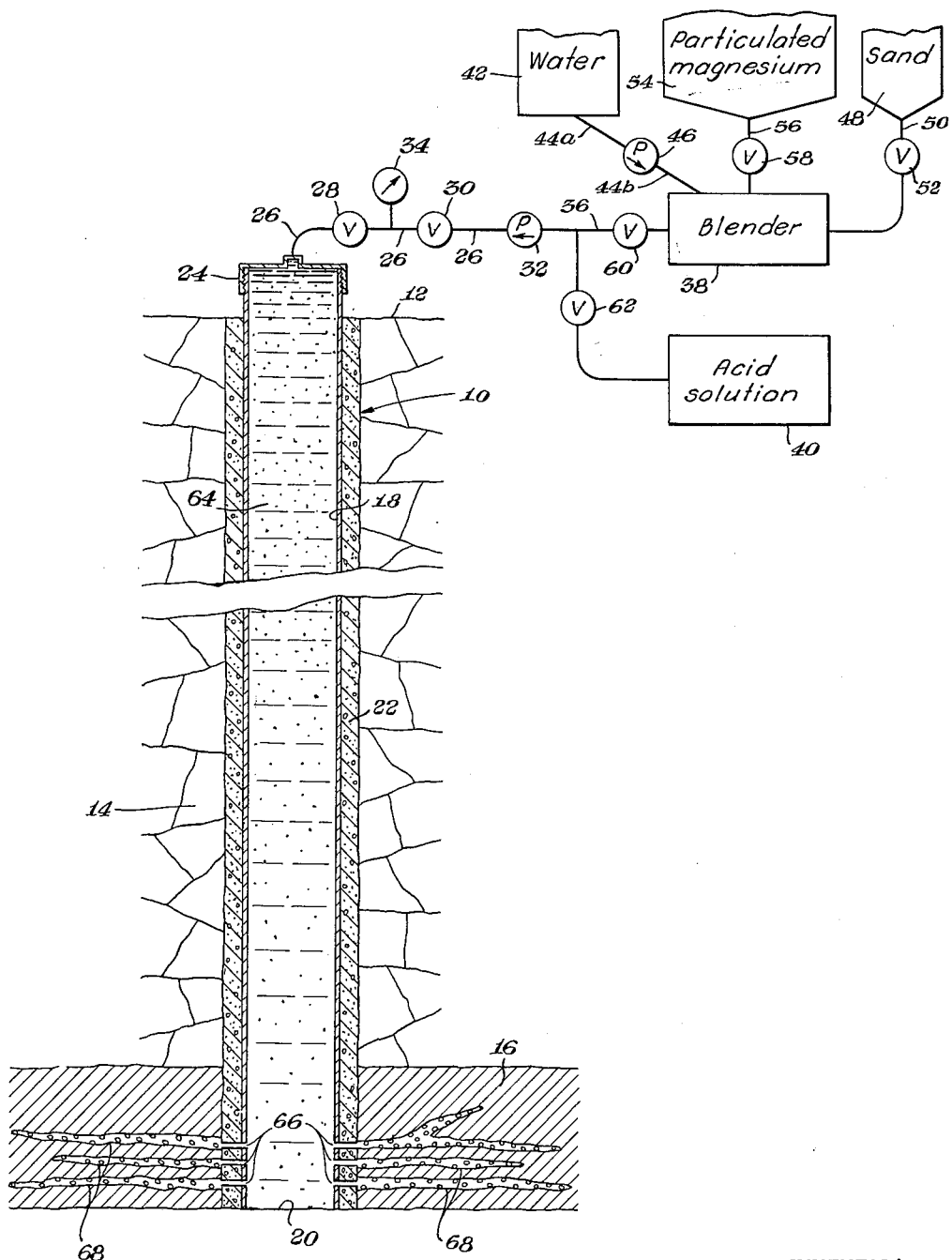

2,975,834
TREATING WELLS BY INJECTION OF METAL AND ACID

Samuel R. West, Wichita, and Jack C. Thompson, Eureka, Kans., and James R. Paul, Carmi, Ill., assignors to The Dow Chemical Company, Midland, Mich., a corporation of Delaware Filed May 14, 1957, Ser. No. 659,014
2 Claims. (Cl. 166—42)

This invention relates to a method of increasing or restoring the permeability of earth formations which are penetrated by a well bore and particularly relates to a method of restoring the permeability of earth formations into which water is injected as in water flooding and brine disposal wells.

It has been found that the formation permeability of earth wells used for water injection purposes tends to decrease during the life of the well or wells. Eventually the formation permeability of many wells has decreased to an extent where the wells are no longer useful as disposal wells.

Analyses of the deposits taken from injection wells have indicated the presence of paraffin, oil, bacteria, silt, sand, carbonate and sulfate materials and various iron oxides and iron sulfides. However, in wells in which the water was chemically treated before it was injected, some of the above materials may be absent.

Attempts have been made to remove the above deposits by injecting acid into the formation. However, a serious drawback to the use of acid is that some of the dissolved deposits may precipitate out of solution while in the formation if the acid is allowed to spend completely. For example, ferric iron and aluminum hydroxides will begin to precipitate in a bulky gelatinous form after the pH of the acid treating solution rises above 2.7. Such precipitation can easily nullify any benefit received from an acidizing treatment if the iron or aluminum is redeposited in gelatinous form in the formation at points remote from the well bore.

Further, acid treatments ordinarily do not cause paraffin to be removed from the well formations. In fact paraffin coating of the formation may prevent the acid from acting on an otherwise acid soluble part of the formation.

Control or elimination of sulfate reducing bacteria which are present in many wells, especially water flooding or input wells, is another troublesome problem. Attempts have been made to inject bactericides into the wells, but the bacteria quickly become resistant to the killing action of most bactericides. Further, the use of the most effective types of bactericides to kill the bacteria present in water flowing input wells is quite expensive in view of the large volume of fluid in the wells.

Accordingly, a principal object of this invention is to provide an improved method of maintaining the permeability of fluid carrying earth well formations.

Another object of this invention is to provide an improved method of removing deposited materials from earth formations into which water or brine has been injected.

A further object of this invention is to provide an improved method of killing bacteria present in formations adjacent to a well bore.

In accordance with this invention particulated magnesium or other light metal is pumped as a slurry down the well (through the casing or tubing) and into the adjacent "producing" earth formation which may be the formation into which water or brine is injected if the well is used as an injection well. After the magnesium-containing slurry is pumped into the formation or formations adjacent to the well bore, an acidizing solution containing an iron complexing agent is pumped into the formation or formations, reacting with the magnesium to generate heat which warms the acid solution enough to kill bacteria on contact, melt paraffin which may be clogging the formation, and increase the activity of the acid. The iron complexing agent prevents the precipitation of iron-containing compounds which might, under the well treating conditions, otherwise settle out as precipitates while in the formation and decrease the permeability of the formation which was treated.

The invention, as well as additional objects and advantages thereof, will best be understood by reading the following detailed description in connection with the single drawing which shows, in diagrammatical form, a well bore which penetrates fracturable formations and apparatus used in practicing this invention.

Referring to the drawing, there is shown a bore hole 10 which extends from the surface 12 of the earth through a number of earth formations 14 and a gas or oil producing or water or brine injection formation 16.

A string of casing 18 extends from the earth's surface 12 to the bottom 20 of the bore hole 10. The space betwen the casing 18 and the wall of the well bore 10 is filled with cement 22. The upper end of the casing 18 is capped with a casing head 24 to which is coupled a pipe 26 which includes along its length valves 28, 30 and which is connected to a pump 32. A pressure indicating gauge 34 is coupled into the pipe 26 between the valves 28, 30.

Another section of pipe 36 connects the pump 32 to a blender unit 38 and to an acid container 40. The blender unit 38, for example, may be a tank having rotatable paddles or agitator elements disposed therein, plus inlets for the materials to be blended and, of course, an outlet (into pipe 36, as herein described) for the blended product. A water tank 42 is coupled through a pipe section 44a to a pump 46 and thence through a pipe section 44b to the blender 38. A sand or particulated materials reservoir 48, illustrated as a gravity feed hopper, is also coupled through a tube 50 containing a valve 52 to the blender 38. A hopper 54 containing magnesium particles is coupled to the blender through a tube 56 containing a valve 58. If desired, other means of feeding the particulated materials into the blender 38 may be used.

The blender 38 and acid container 40 are separated from the pump 32 by valves 60, 62 respectively.

In operation, particulated magnesium (or aluminum, zinc, or light metal alloy) is fed into the blender 38 along with water from the tank 42 and mixed to form a pumpable slurry. Then, with the valve 60 opened and the valve 62 closed, the slurry is pumped from the blender 38 by the pump 32 through the line 26 and valves 28, 30 into the well casing 18. As the casing becomes filled, the slurry 64 which contains the particulated magnesium and carrying agent described above as water, passes through casing perforations 66 and is forced into the formation 16 in fractures 68 which already exist or are formed due to the hydrostatic pressure exerted on the slurry 64 by the pump 32.

Preferably sufficient pressure is exerted on the column of slurry 64 to "break down" or fracture the formation 16, thus enlarging and extending the channels or permeable parts of the formation 16 through which fluids may pass from the well into the formation or vice versa.

The particulated magnesium is thus forced deep into the fractures 68 of the formation 16.

After the desired amount of slurry has been pumped into the fractures 68, the valve 60 is closed, the valve 62 is opened and acid solution containing an iron complexing agent is pumped into the casing 18 and thence into the fractures 68. The acid solution forces the water or oil carrying agent of the slurry further into the less permeable part of the formation 16, leaving the particulated magnesium as a propping agent in the fractures 68. When the required amount of acid is pumped into the well, the well is shut in as by closing the valve 30. When the acid solution contacts the magnesium in the fractures 68, a chemical reaction takes place in which considerable heat of reaction is generated. The amount of magnesium which is forced into the fractures 68 is less than enough to completely react with the acid but enough to raise the temperature of the acid solution to an amount sufficient to melt paraffin deposits built up along the fractures 68 and to kill bacteria present in the fractures. In addition, the hot acid solution has a higher rate of attack on the formation 16 than does acid which is at the normal temperature of the formation. The iron complexing agent, which may be lactic acid, citric acid, glycollic acid or glycine, for example, prevents the precipitation of dissolved iron as the pH of the acid solution rises during the treatment. Further, the complexing agent exhibits a buffering action which tends to hold the pH of the acid solution lower for a longer time than would occur if no complexing agent were used. Such action is beneficial in killing formation bacteria with acid.

If no complexing agent were used in the acid solution, iron dissolved as the acid attacked the formation 16 would precipitate out as a gelatinous mass as the pH of the acid solution raised, tending to plug the fractures.

Although the major acid component of the acid solution is commonly hydrochloric acid, sulfuric, phosphoric or nitric acids could be substituted for the hydrochloric acid.

Also, in order that propping agents remain in the fractures 68 after the magnesium is removed by acid action, sand from the hopper 48 may be mixed with particulated magnesium to form a slurry containing both types of particulated materials.

After the acid solution has been in the formation for a time sufficient to "spend" the acid (that is, time enough to allow the acid to be chemically neutralized as a result of its reaction with the magnesium and the formation), pressure at the well head is released and the spent acid and other well fluids flow back into the casing 18. Often a swabbing operation is utilized to help withdraw formation fluids into the well casing.

However, in water flooding injection wells it may be advisable or practicable to forego the swabbing operation and continue pumping water or brine solution into the casing, forcing the spent acid solution further into the formation 16.

Alternatively, the well 10 may be provided with a string of tubing (not shown) which extends down the casing 18 and is terminated near to the perforations 66. The slurry may be pumped through the smaller diameter tubing with a packer (not shown) set above the lower end of the tubing to prevent any flow of fluid in the annulus above the packer. When a packer and tubing are in the well, treating fluids may be pumped through the tubing and hence through the casing perforations below the packer. Such an arrangement reduces the volume of fluid needed in making the treatment.

In one treatment made in accordance with this invention 50 pounds of particulated magnesium were mixed with about 50 gallons of water to form a slurry which was pumped into the well and displaced to the bottom of the well and into the earth formation by pumping more water behind the slurry.

The sieve analysis of the particulated magnesium was as follows:

| Through: | Percent |
|---|---|
| 20, retained on 35 mesh | 22 |
| 35, retained on 48 mesh | 38 |
| 48, retained on 65 mesh | 27 |
| 65, retained on 100 mesh | 10 |
| 100 mesh screen | 3 |

(The slurry containing particulated magnesium usually contains from one to three pounds of magnesium per pound of carrying agent, such as water or oil, for example.)

Following the injection of the magnesium-containing slurry into the formation 500 gallons of acid solution (468 gallons of 15 percent hydrochloric acid (inhibited) and 32 gallons of 44 percent lactic acid) were pumped into the formation.

After the acid solution was pumped into the formation, the well was shut in until the next day. The spent acid solution was then swabbed from the well bore. Alternatively, as mentioned previously, since the dissolved iron compounds were in solution due to the addition to the hydrochloric acid solution of the lactic acid iron complexing agent, the spent acid solution might have been pumped further into the formation during the normal operation of an injection well without the above mentioned swabbing step being performed.

However, the preferred practice is to swab the well in order to remove from the formation melted paraffin or asphaltic materials, dissolved iron deposits, bacteria and spent acid.

Fluids which may be used in making the slurry containing particulated magnesium (or particulated aluminum or zinc) include water and oil (thickened and unthickened) and emulsions thereof. Aqueous liquids are better carrying agents than oily liquids because the acid which is later injected in the well can better contact the metal.

Although phosphoric acid solution or sulfuric acid solution may be used as the major component of the acid solution, such acids should be used only in formations containing small amounts of calcium in order to prevent clogging the formation with calcium sulfate or calcium phosphate.

While in the described well treatment only 50 pounds of particulated magnesium was injected into the formation, well treatments in which up to 10,000 pounds of particulated magnesium are used are considered practical. The amount of acid solution used may vary from the ratio of 500 gallons to each 50 pounds of particulated magnesium, but the quantity of acid solution should be substantially more than the amount which will react with the acid solution in order that unspent hot acid is available to react on the deposits in the formation.

The temperature rise obtained when 500 gallons of 15 percent hydrochloric acid is reacted with magnesium of various amounts is estimated to be as follows:

A 20 degree F. temperature rise for each 7.5 pounds of magnesium, used (up to the limit of magnesium with which the acid can react). For example, 70 pounds of magnesium in 500 gallons of 15 percent hydrochloric acid produced a temperature rise of the acid of 170 degrees Fahrenheit.

Tests have shown that less citric acid is needed as an iron complexing agent than if lactic acid is used. For example, when a 15 percent hydrochloric acid solution containing 5,000 parts per million of ferric iron and lactic acid is spent, it has been found that 20,000 parts per million of 44 percent strength lactic acid must be present in the solution to prevent the precipitation of the iron as ferric hydroxide. However, citric acid (96 percent active form) in the amount of 10,000 parts per million present in the solution is sufficient to prevent precipitation of ferric hydroxide if citric acid is substituted for lactic acid.

Prior to making well treatments in accordance with this invention it may be desirable to flush out the well bore, especially adjacent to the earth formation which is to be treated, with water or with slugs of hydrochloric acid interspersed with water flushing.

Injecting either the slurry or acid solution, or both, at pressures which "fracture" or break down the earth formation causes the acid and particulated magnesium to penetrate further into the formation than would otherwise be practicable. Since the heated acid solution kills only bacteria with which it comes in contact, the expanding of the earth formation during the fracturing operation assures greater penetration of the heated solution into the formation and a larger number of killed bacteria.

An inhibitor is used with the hydrochloric acid to mitigate corrosion of the acid container, pipes and well casing. A satisfactory inhibitor for this purpose is disclosed in U.S. Patent 2,606,873. Other inhibitors are the acid compatible rosin amines and hydrogenated rosin amines (see U.S. Patents 2,510,063 and 2,510,284.)

We claim:

1. A method of treating a cased, cemented earth well having casing perforations adjacent to a fluid permeable formation, comprising introducing a pumpable slurry of fluid carrying agent and particulated light metal into said well bore and applying sufficient pressure to fracture said formation and cause a substantial penetration of said slurry into the earth formation adjacent to the well bore, then injecting into said formation an iron complexing agent and an acid solution in an amount sufficient to dissolve said light metal, and closing in the well.

2. A method of treating a cased, cemented earth well having casing perforations adjacent to a fluid permeable formation, comprising introducing a pumpable slurry of fluid carrying agent and particulated light metal into said well bore and applying sufficient pressure to cause a substantial penetration of said slurry into the earth formation adjacent to the well bore, then injecting into said earth formation an iron complexing agent and an acid solution in an amount sufficient to dissolve said light metal, the light metal being present in an amount sufficient to raise the temperature of the said solution in the formation to at least one-hundred eighty-five degrees Fahrenheit.

References Cited in the file of this patent
UNITED STATES PATENTS

| | | |
|---|---|---|
| 2,207,184 | White | July 9, 1940 |
| 2,238,930 | Chamberlain et al. | Apr. 22, 1941 |
| 2,699,212 | Dismukes | Jan. 11, 1955 |
| 2,754,910 | Derrick et al. | July 17, 1956 |